(12) United States Patent
Hsia et al.

(10) Patent No.: US 10,101,550 B1
(45) Date of Patent: Oct. 16, 2018

(54) PACKAGING OF AN OPTICAL FIBER COMBINER

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 0 days.

(21) Appl. No.: 15/727,569

(22) Filed: Oct. 7, 2017

(51) Int. Cl.
*G02B 6/44* (2006.01)
*F21V 8/00* (2006.01)

(52) U.S. Cl.
CPC ......... *G02B 6/4432* (2013.01); *G02B 6/0008* (2013.01); *G02B 6/4436* (2013.01)

(58) Field of Classification Search
CPC .................................... G02B 6/44; F21V 8/00
USPC ......................................... 362/553, 551, 554
See application file for complete search history.

(56) References Cited

U.S. PATENT DOCUMENTS

2015/0131684 A1\* 5/2015 Kise ...................... H01S 5/0427
372/26

\* cited by examiner

*Primary Examiner* — Edwyn Labaze
(74) *Attorney, Agent, or Firm* — Han IP Corporation; Andy M. Han

(57) ABSTRACT

A heat-sinking package of an optical fiber combiner comprising an optical fiber combiner assembly and a case operates for a uniform temperature gradient inside the case. The optical fiber combiner assembly, fixed inside the case, comprises an overlay structure and an optical fiber combiner. The overlay structure comprises a long shallow receptacle divided by three compartments on upper side of the overlay structure, in which the optical fiber combiner is fixed with three epoxies respectively applied in the three compartments. The three epoxies with different refractive indices accommodated in the three compartments of the long shallow receptacle not only fix the optical fiber combiner in place but also serve thermal contacts to effectively disperse the heat generated in the optical fiber combiner to the overlay structure, further dispersing to surroundings of the case. The overlay structure further comprises one or more thermally conductive sheaths to more efficiently disperse the heat.

15 Claims, 6 Drawing Sheets

PACKAGING OF AN OPTICAL FIBER COMBINER

TECHNICAL FIELD

The present disclosure relates to packaging of an optical fiber combiner used in high optical pump power applications and more particularly to various thermal dispersion schemes in packaging such an optical fiber combiner to improve its thermal performance and reliability.

BACKGROUND

High power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of optical fiber type, connected using fusion splices without air interfaces between any two of the optical components in connection. The optical components include multiple diode laser pumps with multiple optical fiber pigtails, an amplification optical fiber with two fiber Bragg gratings, a transmission fiber spliced to the amplification optical fiber, and an optical fiber combiner with multiple input optical fibers to splice to the multiple optical fiber pigtails of the multiple diode laser pumps and with an output optical fiber to splice to the amplification optical fiber. The amplification optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The amplification optical fiber with the gain medium receives and absorbs optical energy from the multiple diode laser pumps through the optical fiber combiner and creates a coherent laser light via a resonator built by using the two fiber Bragg gratings at two ends of the amplification optical fiber. Such multimode fiber lasers in the 2- to 6-kW regime are ideal for cutting and welding, and particularly in the area of materials processing and laser machining as a reliable replacement for bulky diode pumped solid-state lasers and $CO_2$ lasers. It has been shown that lengthening the amplification optical fiber can inherently increase power of the fiber lasers without a limit. However, double clad optical fibers (DCOFs) used in both the output optical fiber of the optical fiber combiner and the amplification optical fiber are surrounded by a polymer coating with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCOFs, however, perform both mechanical and optical functions. DCOFs use dual acrylate coatings, with a first low refractive index polymer coating in contact with the glass, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCOFs with the dual acrylate coating can pass the stringent reliability test specified by Telcodia GR-20 standard used in the telecom industry. Without doubt, DCOFs with the dual acrylate coating have a high tensile strength of greater than 700 kpsi and an exceptional stress corrosion resistance. However, according to the GR-20 standard, after exposing DCOFs to an environment of 85° C. and 85% relative humidity (RH) for 720 hours, it shows that an excess loss for laser output power due to possible degradation of the low refractive index coating with exposure to temperature and humidity. It was noted that the 85° C./85% condition not only affects the optical reliability of the low refractive index coating but also causes OH ingression into glass in the core of the optical fiber, increasing attenuation of the glass core. For example, the attenuation in the typical pump wavelength range is well below a negligible 0.01 dB/m. After exposure the optical fiber to temperature and humidity, either wavelength-dependent or independent attenuation increases. The attenuation, in general, is associated with OH ingression in the silica, glass defects formed due to moisture ingression, and light scattered by the low refractive index polymer. That is, during the 85° C./85% RH test, moisture not only degrades the low-index polymer but also penetrates the glass cladding, resulting in the excess fiber loss.

An N×1 tapered fiber bundles (TFBs) or optical fiber combiner is used to combine multiple ("N") input multimode fiber pigtails from pump diodes into a single output fiber. The "N" satisfies the brightness conservation theorem, and the maximum "N" is 6, 13, 17, 24, 53, 63, 136, etc., depending on various combinations of various diameter and numerical aperture (NA) of the input optical fibers and the output optical fiber. In practice, the N is chosen to be far smaller than the maximum numbers specified above to provide some margin. The optical fiber combiner is typically fabricated in a process similar to fused fiber couplers by bundling in parallel N multimode optical fibers that have been stripped of their polymer coatings. The fibers are then fused and tapered by heating with a flame such as electric arc, oxyhydrogen flame, or a $CO_2$ laser beam. The fused and tapered section is then cleaved in the middle and spliced to the single output fiber. The use of optical fiber combiners to combine multiple laser diode pumps into one fiber is essential for pumping the fiber lasers. For a 7×1 combiner, each of seven input optical fibers with 200-μm diameter and 0.22 NA receives, for example, 200 W from each diode laser pump. Seven such laser pumps are combined into a single 400 μm double-clad fiber with 0.46 NA. This configuration gives a pumping module composed of active and passive components, delivering 1.4 kWs power for a fiber laser, based on the commercially available 200-W laser diode pumps. For more examples, with a Yb-doped fiber of 400 μm and 0.46 NA, a common optical fiber combiner coupling six 200 μm 0.22 NA pump delivery fibers each with a pump power of 500 W provides a total power greater than 3 kWs. Using a 19×1 optical fiber combiner and greater than 100-W pump power delivered in each 105-μm input optical fiber, a total of about 2-kW pump power can be achieved.

The optical fiber combiners can also be used in optical fiber amplifiers to combine pump and signal light that is confined to the core of the double-clad fiber. In this case, the fiber in the center of the optical fiber combiner is replaced by a fiber with a core carrying an amplifier seed. This is commonly referred to as an (N+1)×1 combiner, which is critical for the optical fiber amplifiers. As an example, a (6+1)×1 combiner accommodating six pump fibers and one signal fiber can be used for a 1 kW co-pumped optical fiber amplifier, based on six pump diodes each delivering, for example, 250 W of pump power for a total pump power of 1.5 kWs. No matter whether 7×1 or (6+1)×1, the optical fiber combiner needs to be thermally managed to maintain its reliability. Specifically, the residual pump power, ASE power, and unwanted signal power trapped in the cladding of a double-clad fiber in the fiber laser or the optical fiber amplifier need to be removed to avoid potential damage to components downstream. The residual pump power can be in the hundreds of watts in kW fiber lasers and the ASE can be in the range of many watts, typically much higher in the optical fiber amplifier. The unwanted energy launching into the cladding of a double-clad fiber creates localized hot spots or catastrophic burns at high pump powers. The most efficient way to remove the cladding light is to strip the low-index fluoroacrylic coating off a length of the fiber and re-coat it with a high-index coating so that high-NA cladding light can be stripped.

As mentioned above, high-power optical fiber combiners are critical for highly reliable high-power fiber lasers. In the high-power fiber lasers, an integrated water-cooled package has been proposed, in which an N×1 optical fiber combiner is completely immersed in the circulating water for efficient cooling. In this case, however, OH ingression in the silica and glass defects generated from moisture ingression can reduce the reliability of such N×1 optical fiber combiner. It is, therefore, the purpose of this patent application to disclose several thermal dispersion schemes that can be used in packaging the optical fiber combiner to effectively remove heat from so called localized hot spots while maintaining the N×1 optical fiber combiner a stand-alone device without connecting to circulating water for cooling and increasing reliability by not exposing the N×1 optical fiber combiner to water.

SUMMARY

A heat-sinking package of an optical fiber combiner comprising an optical fiber combiner assembly and a case operates for a uniform temperature gradient inside the case. The optical fiber combiner assembly, fixed inside the case, comprises an overlay structure and an optical fiber combiner. The optical fiber combiner comprises a tapered fiber bundle (TFB) with multiple input optical fibers connected to multiple laser diode pumps and an output optical fiber spliced to a smaller taper end of the TFB. The overlay structure comprises a long shallow receptacle divided by two bulkheads for three compartments on the upper side of the overlay structure, in which the optical fiber combiner is fixed with three epoxies respectively applied in the three compartments. The two bulkheads are so positioned substantially in the middle area of the coating-stripped portion of the optical fiber combiner that two short sections of the coating-stripped portion of the optical fiber combiner near the respective interfaces between the coating-stripped portion and the multiple input optical fibers and output optical fiber are in the first and the third compartments. The three epoxies with different refractive indices accommodated in the three compartments of the long shallow receptacle not only fix the optical fiber combiner in place but also serve thermal contacts to effectively disperse the heat generated in the optical fiber combiner to the overlay structure, further dispersing to surroundings of the case. In thermal dispersion, the thermal contact approach outperforms a conventional approach using air as a thermal dispersion medium. Furthermore, the three epoxies with different refractive indices are selected to control unwanted optical beams not to launch to the polymer coatings of the multiple input optical fibers and the output optical fiber to minimize occurrence of localized hot spots which may possibly damage the optical fiber combiner.

The overlay structure may be built based on three-dimensional (3-D) printing, taking advantages of its cost-effectiveness. The overlay structure may comprise a resin and a metal powder mixed in the resin to achieve a predetermined thermal conductivity and a predetermined thermal expansion coefficient that are needed to control heat dispersion and to maintain reliability in the optical fiber combiner used in high-power pump applications.

In one embodiment, the overlay structure further comprises at least one thermally conductive sheath along the long shallow receptacle configured to thermally contact the optical fiber combiner in such a way that the heat generated in the optical fiber combiner can be more efficiently dispersed to the case. In another embodiment, the case further comprises a heat pipe configured to be installed in a hole near bottom of the case, with a wick on the inner surface of the heat pipe. In this case, a cool working fluid moves through the wick from the condenser side, which protrudes an end of the case, to the evaporator side, which is embedded in the case, where it vaporizes. The vapor then moves to a heat sink of the condenser, where the working fluid condenses, releasing its latent heat. The cycle repeats to continuously remove heat from the case, achieving the most powerful heat transfer from the optical fiber combiner.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
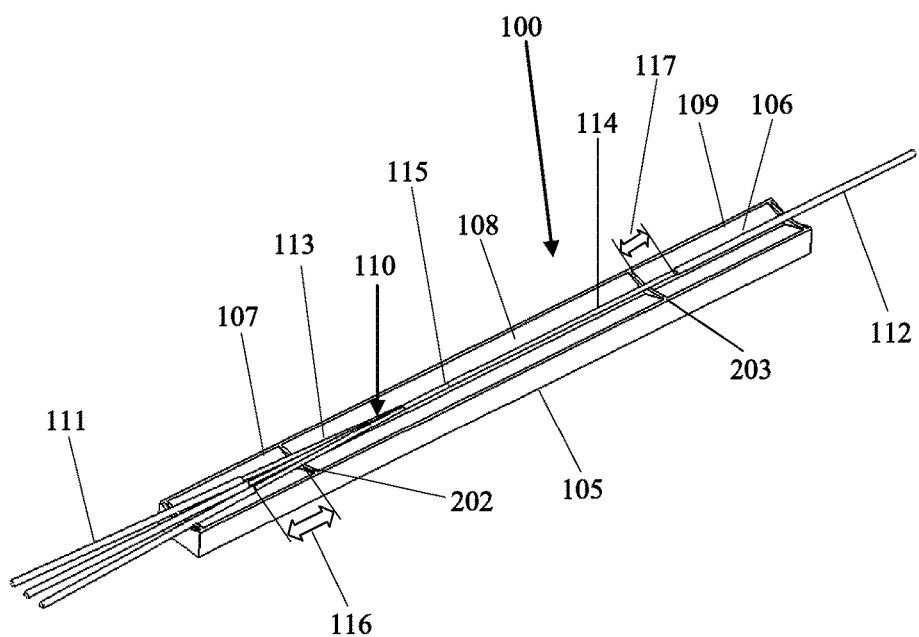
FIG. 1 is a perspective view of an optical fiber combiner assembly according to the present disclosure.

Reference will now be made in detail to the preferred embodiments of the disclosure. Wherever possible, same or similar reference numerals are used in the drawings and the description to refer to the same or like parts or steps. The drawings are in their simplest form and are not to scale.

FIG. 1 is a perspective view of an optical fiber combiner assembly according to the present disclosure. An optical fiber combiner assembly 100 comprising an overlay structure 105 and an optical fiber combiner 110. The overlay structure 105 comprises a long shallow receptacle 106 divided by two bulkheads 202 and 203 into three compartments 107, 108, and 109 on upper side of the overlay structure 105. The optical fiber combiner 110 comprises multiple input optical fibers 111 and an output optical fiber 112. The optical fiber combiner 110 is fixed on the upper side of the overlay structure 105 with three epoxies respectively applied in the three compartments 107, 108, and 109.

The optical fiber combiner 110 is basically an N×1 tapered fiber bundle pump combiner, where "N" is a number of possible input optical fibers that satisfy the brightness conservation theorem. The optical fiber combiner 110 is hexagonally packed fiber bundles fused and tapered for stability and high packing density. The resulting cross section of these hexagonally stacked bundles is close to a circle, and thus eases splicing with the output optical fiber 112. The optical fiber combiner 110 is used to combine several input multimode fiber pigtails (i.e. the multiple input optical fibers 111) from laser diode pumps into the single output fiber 112. It is typically fabricated in a process similar to fused fiber couplers by bundling in parallel N multimode optical fibers that have been stripped of their polymer coatings with a coating-stripped portion 113 exposed. The N multimode optical fibers are then fused and tapered by heating with a flame, electric arc, oxyhydrogen flame, or a $CO_2$ laser beam. The fused and tapered section is then cleaved in the middle and spliced to the output fiber 112, also having been stripped beforehand for a coating-stripped portion 114 near a fusion splice 115. The two bulkheads 202 and 203 are so positioned substantially in the middle area of the stripped portion of the optical fiber combiner 110 that two short sections of the stripped portion of the optical fiber combiner 110 near the respective interfaces between the stripped portion and the multiple input optical fibers 111 and the output optical fiber 112 are in the first and the third compartments 107 and 109, respectively. The three epoxies applied in the overlay structure have respective high, low, and high refractive indices relative to a refractive index of the glass core of the multiple input optical fibers 111 and the output optical fiber 112. The first and the third epoxies with high refractive indices are applied to remove undesired cladding modes so as to control some high NA beams not to launch to the polymer coatings of the multiple input optical fibers and the output optical fiber to minimize occurrence of localized hot spots which may possibly damage the optical fiber combiner. The second epoxy with a low refractive index, however, is applied to prevent guided modes from leaking out of the optical fiber combiner 110. When a fiber laser is used in cutting or welding applications, the originally forward-propagating laser light may be back-reflected and returned from a workpiece to reach the multiple input optical fibers 111 of the optical fiber combiner 110. This unwanted back-reflected laser light may launch to the polymer coatings of the multiple input optical fibers, creating the hot spots and reducing reliability, and thus must be removed before launching into the polymer coatings. The first epoxy with the high refractive index applied to the first compartment covered a short section 116 of the coating-stripped portion 113 can efficiently do the job. Similarly, the multiple forward-propagating laser pumps inputted from the multiple input optical fibers 111 are combined in the optical fiber combiner 110 and outputted to the output optical fiber 112 via the coating-stripped portion 114. Thus, the third epoxy with the high refractive index applied to the third compartment covered a short section 117 of the coating-stripped portion 114 can efficiently remove undesired forward-propagating cladding modes of the pumps. In addition, the three epoxies accommodated in the three compartments 107, 108, and 109 of the long shallow receptacle 106 not only fix the optical fiber combiner 110 in place but also serve thermal contacts to effectively disperse the heat generated in the optical fiber combiner 110 to the overlay structure 105, further dispersing to surroundings of a case, to be discussed in FIG. 2. In thermal dispersion, the thermal contact approach outperforms a conventional approach using air as a thermal dispersion medium. This is especially true when epoxy thickness is controlled to less than several tenths of mini-meter. In brief, when a fiber laser reaching kWs or tens of kWs, an optical energy leakage from both forward and back-reflected propagating core-guided light to the adjacent cladding at air-quartz interfaces and splices between various fibers becomes significant. Once in the cladding, the optical energy leakage induces thermal loads on a polymeric coating surrounding the cladding. The coating, configured to maintain the structural integrity, may experience such thermal loads and, in worst case, damage both the optical fiber combiner 110 and optical components upstream.

The overlay structure 105 may be built based on 3-D printing, cold-casting, or other means, taking advantages of cost-effectiveness using such technologies. In building the overlay structure with the cold-casting, a metal powder filler can be used in processes of mixing with a resin and applying the mixture into a mold of the overlay structure 105. Depending on filler concentration, the finished overlay structure 105 gives a predetermined thermal conductivity and a predetermined thermal expansion coefficient that are needed in the optical fiber combiner applications. Similarly, the overlay structure 105 may be made of a polymer material with a proper filler for a predetermined thermal conductivity and a predetermined thermal expansion coefficient. For various applications, the overlay structure 105 may be made of an optically transparent material. The overlay structure 105 may be made of a sapphire substrate, providing a thermal conductivity of 26 W/m° C. and a thermal expansion coefficient of $6\times10^{-6}$/° C. (parallel to C-axis), with machining and grinding for micro structures mentioned above.

Figure 2:
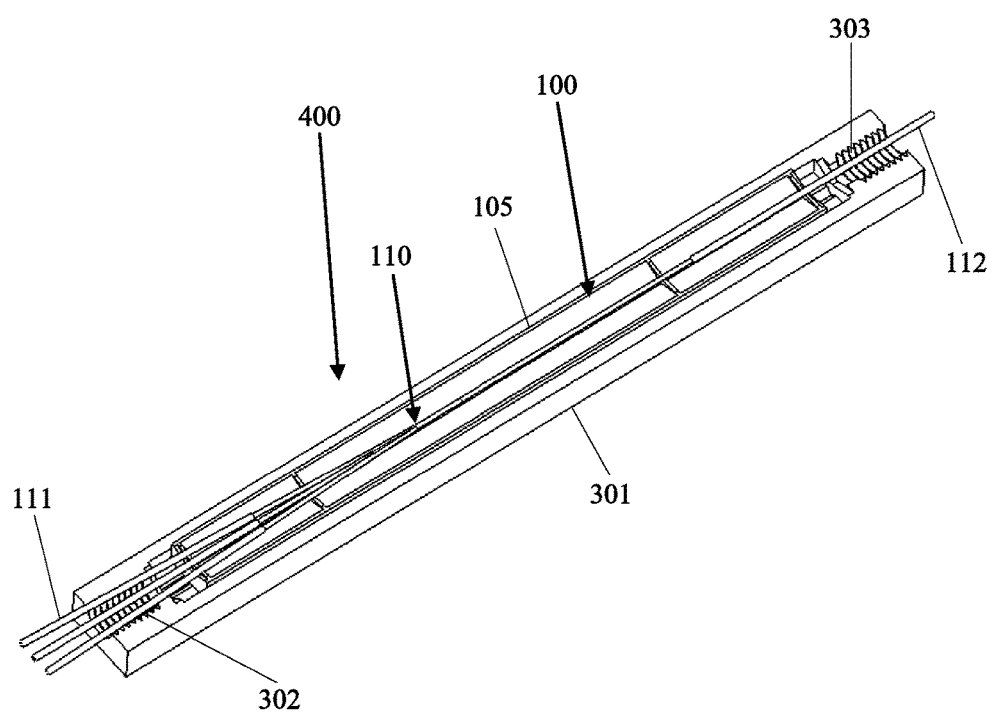
FIG. 2 is a perspective view of a package of an optical fiber combiner according to the present disclosure.

FIG. 2 is a perspective view of a package of an optical fiber combiner according to the present disclosure. A package of optical fiber combiner 400 comprises a case 301 with an optical fiber inlet 302 and an optical fiber outlet 303 and the optical fiber combiner assembly 100 in the case 301. The optical fiber inlet 302 and the optical fiber outlet 303 of the case 301, each comprising a corrugated structure configured to hold an epoxy applied to the multiple input optical fibers and the output optical fiber, are arranged on opposite ends of the case 301, wherein the optical fiber combiner assembly 100 is fixed with a fourth epoxy applied on the bottom side of the overlay structure 105 of the optical fiber combiner assembly 100. Although the fourth epoxy has a thermal conductivity only greater than 0.35 W/m° C. at 27° C., its thermal conduction capability is still significant because the amount of the fourth epoxy applied is tiny with an epoxy thickness less than 0.3 mm. In FIG. 2, the multiple input optical fibers 111 and the output optical fiber 112 of the optical fiber combiner 110 pass through the optical fiber inlet 302 and the optical fiber outlet 303, respectively. To finish packaging the optical fiber combiner 110, a fifth epoxy is applied on the optical fiber inlet 302 and the optical fiber outlet 303, thus completely sealing the case with a case lid (not shown) on top of the case 301. The fifth epoxy, which is flexible, not only secures the multiple input optical fibers 111 and the output optical fiber 112 of the optical fiber combiner 110 in place but also serves as a strain relief to allow the multiple input optical fibers 111 and the output optical fiber 112 to move a little without cracking or breaking. The corrugated structure on the optical fiber inlet 302 and the optical fiber outlet 303 helps the fifth epoxy allow flexibility in the optical fibers without exerting stress on the vulnerable inlet and outlet holding the optical fibers. The corrugated structure on the optical fiber inlet 302 and the optical fiber outlet 303 may be built as an internal thread. When the laser pump power reaches several kWs or several tens of kWs, a temperature near the multiple input optical fibers 111 of the optical fiber combiner 110 may reach 100° C. in a short period of time, especially severe for the back-reflected light. The package of optical fiber combiner 400 can efficiently disperse heat and maintain the temperature at 50° C.

Figure 3:
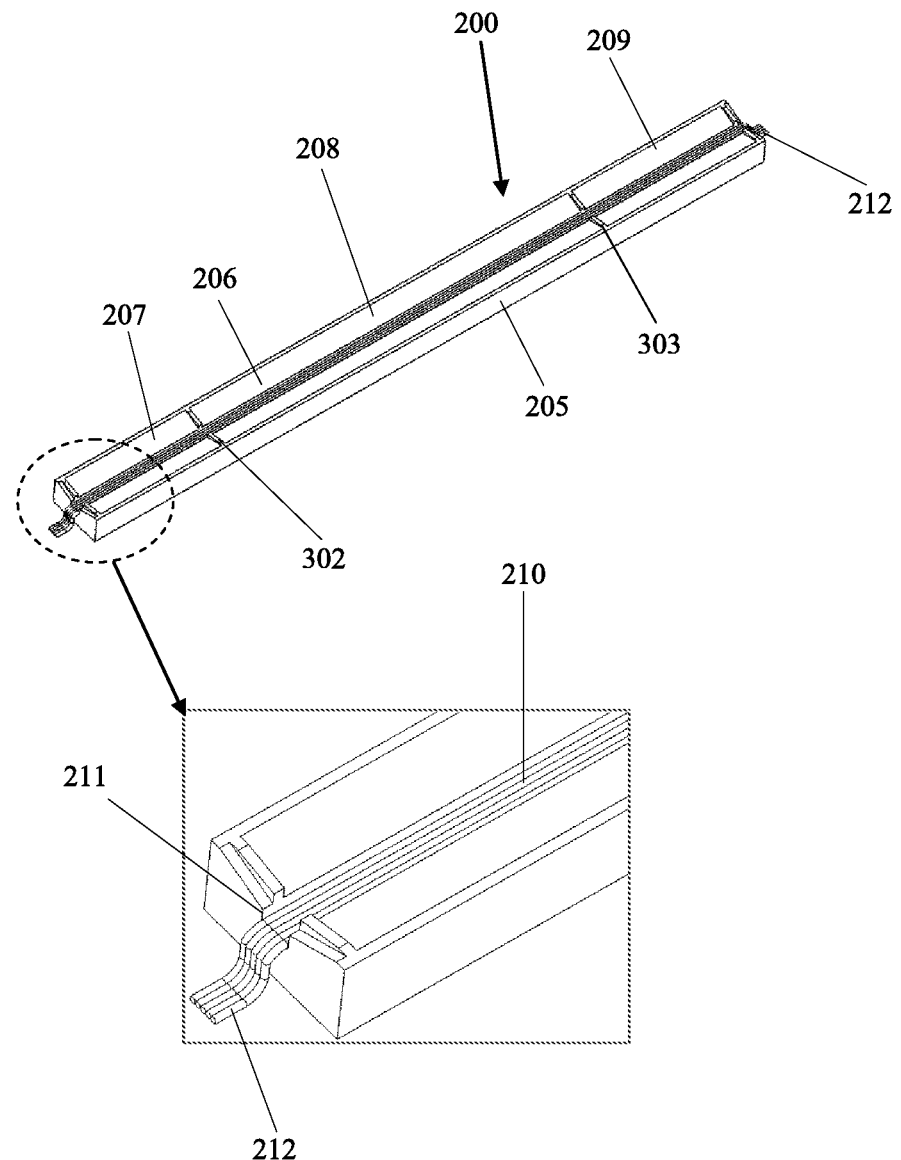
FIG. 3 is a perspective view of an overlay structure with thermally conductive sheaths according to the present disclosure.

FIG. 3 is a perspective view of an overlay structure with thermally conductive sheaths according to the present disclosure. An overlay structure with thermally conductive sheaths 200 comprises an overlay structure 205 and one or more thermally conductive sheaths 210. The overlay structure 205 comprises a long shallow receptacle 206 divided by two bulkheads 302 and 303 into three compartments 207, 208, and 209 on upper side of the overlay structure 205 and a trough 211 at the bottom of the long shallow receptacle 206. The trough 211 is configured to accommodate the one or more thermally conductive sheaths 210, facilitating heat conduction and dispersion. The one or more thermally conductive sheaths 210 protrude the overlay structure 205 in both lengthwise directions with two protrusions 212, which can thermally contact with a packaging case enclosing the overlay structure with one or more thermally conductive sheaths 210 to increase thermal dispersion. The one or more thermally conductive sheaths 210 may be built by using copper wires, braided sleeves, or metallic foils that have a thermal conductivity greater than 100 W/m° C. at 27° C.

Figure 4:
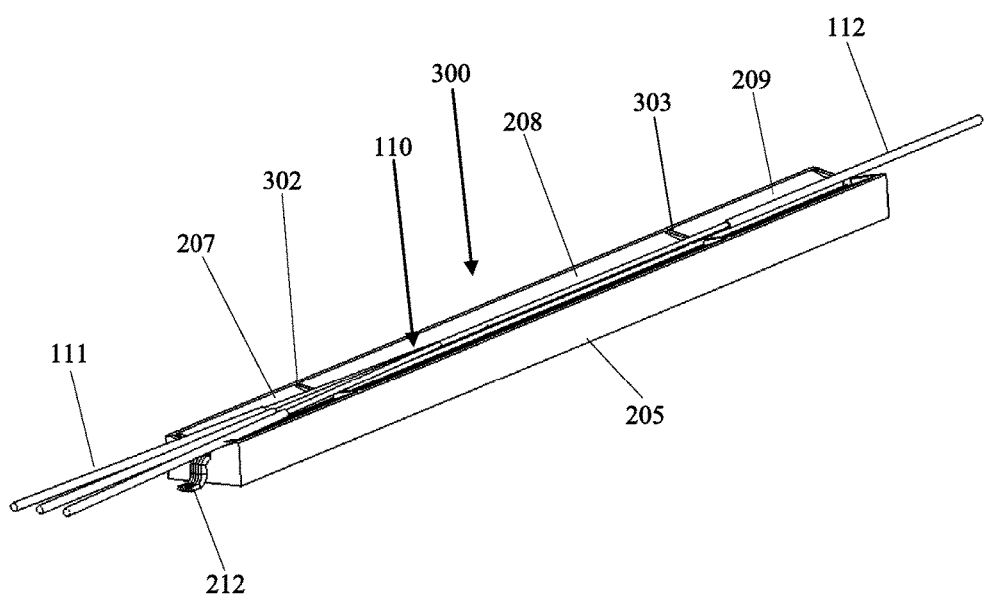
FIG. 4 is a perspective view of an optical fiber combiner assembly with thermally conductive sheaths according to the present disclosure.

FIG. 4 is a perspective view of an optical fiber combiner assembly with thermally conductive sheaths according to the present disclosure. In FIG. 4, an optical fiber combiner assembly 300 comprises the overlay structure 205, depicted in FIG. 3, and the optical fiber combiner 110, depicted in FIG. 1. The overlay structure 205 comprises one or more thermally conductive sheaths 210 (in FIG. 3). The optical fiber combiner 110 comprises the multiple input optical fibers 111 and the output optical fiber 112, wherein the optical fiber combiner 110 is fixed on the upper side of the overlay structure 205 with three epoxies respectively applied in the three compartments 207, 208, and 209 divided by two bulkheads 302 and 303. The three epoxies not only fix the optical fiber combiner 110 on the upper side of the overlay structure 205 but also serve a thermal contact to conduct heat. Above all, the thermal conductivity of the three epoxies used is at least 15 times higher than that of the air. When the epoxy thickness is controlled to less than several tenths of a millimeter, the thermal conduction capability of the three epoxies applied is the most significant. Therefore, the optical fiber combiner assembly 300 has a much better thermal performance than a conventional optical fiber combiner package using air to conduct heat. When an input pump power reaches several tens of kWs, a substantial optical energy loss in the optical fiber combiner converts to large amount of heat. Depending on power efficiency of the optical fiber combiner, the undesired power loss may reach several tens of watts. Such a high power loss causes a temperature increase in the optical fiber combiner 110. When the overlay structure 205 is made of a polymer with limited thermal conductivity, the use of the one or more thermally conductive sheaths 210 in the overlay structure 205 can effectively reduce the temperature accumulated in the optical fiber combiner 110. The thermally conductive sheaths 210 may be built by using copper wires, braided sleeves, or metallic foils that have a high thermal conductivity better than 100 W/m° C. at 27°. In other words, the heat accumulated in the optical fiber combiner 110 may be vertically conducted to the one or more thermally conductive sheaths 210 via a thermal contact and further horizontally conducted to the case 205 via the one or more thermally conductive sheaths 210 for efficient thermal dispersion.

Figure 5:
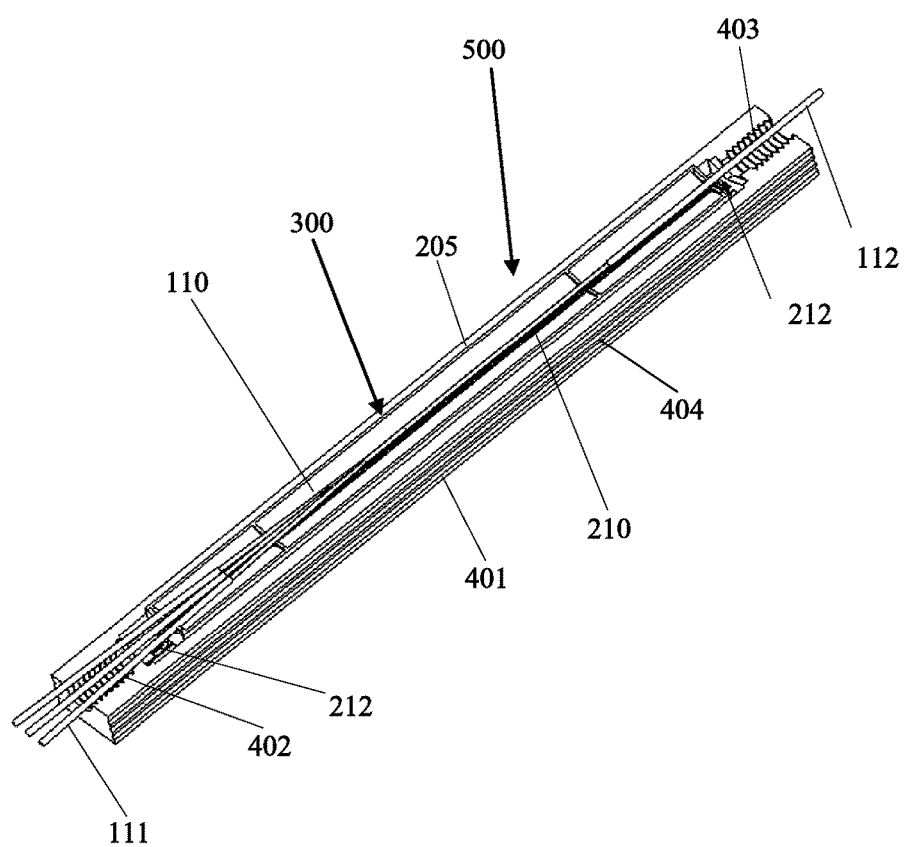
FIG. 5 is a perspective view of an optical fiber combiner assembly packaged in a case with corrugated structures according to the present disclosure.

FIG. 5 is a perspective view of an optical fiber combiner assembly packaged in a case with corrugated structures according to the present disclosure. An optical fiber combiner package 500 comprises a case 401 with an optical fiber inlet 402 and an optical fiber outlet 403 and the optical fiber combiner assembly 300 (depicted in FIG. 4) in the case 401. The optical fiber inlet 402 and the optical fiber outlet 403, each with a corrugated structure, are arranged on opposite ends of the case 401, wherein the optical fiber combiner assembly 300 is fixed with a fourth epoxy applied on the bottom side of the overlay structure 205 of the optical fiber combiner assembly 300. The fourth epoxy has a thermal conductivity greater than 0.35 W/m° C. at 27° C. In FIG. 5, the multiple input optical fibers 111 and the output optical fiber 112 of the optical fiber combiner 110 pass through the optical fiber inlet 402 and the optical fiber outlet 403, respectively. To finish packaging the optical fiber combiner, a fifth epoxy is applied on the optical fiber inlet 402 and the optical fiber outlet 403. With corrugated structures on the optical fiber inlet 402 and the optical fiber outlet 403, the fifth epoxy can more reliably seal the case 401 with a case lid (not shown) on top of the case 501. The fifth epoxy, which is flexible, not only secures the multiple input optical fibers 111 and the output optical fiber 112 of the optical fiber combiner 110 in place but also serves as a strain relief to allow the multiple input optical fibers 111 and the output optical fiber 112 to move a little without cracking or breaking. The corrugated structure on the optical fiber inlet 402 and the optical fiber outlet 403 helps the fifth epoxy allow flexibility in the optical fibers without exerting stress on the vulnerable inlet and outlet holding the optical fibers. In FIG. 5, the thermally conductive sheaths 210 (in FIG. 3) protrude the overlay structure 205 in both lengthwise directions with two protrusions 212, which can be fixed inside the case 401 as thermal contacts to increase thermal dispersion. Furthermore, the case 401 comprises corrugated structures 404 on its outer surfaces, configured to disperse heat from the case 410 to its environment, thus maintaining a thermal equilibrium of the optical fiber combiner package 500.

Figure 6:
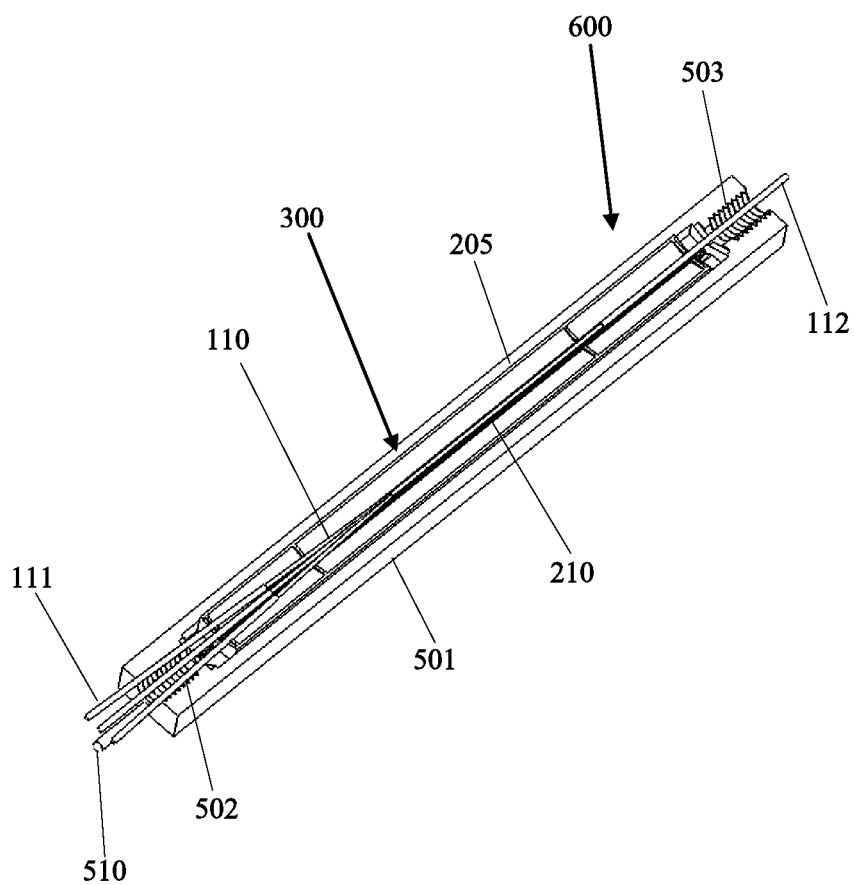
FIG. 6 is a perspective view of an optical fiber combiner assembly packaged in a case with a heat pipe according to the present disclosure.

FIG. 6 is a perspective view of an optical fiber combiner assembly packaged in a case with a heat pipe according to the present disclosure. An optical fiber combiner package 600 comprises a case 501 with an optical fiber inlet 502 and an optical fiber outlet 503 and the optical fiber combiner assembly 300 (depicted in FIG. 4) in the case 501. The optical fiber inlet 502 and the optical fiber outlet 503, each comprising a corrugated structure, are arranged on opposite sides of the case 501, wherein the optical fiber combiner assembly 300 is fixed with a fourth epoxy applied on the bottom side of the overlay structure 205 of the optical fiber combiner assembly 300. The fourth epoxy has a thermal conductivity greater than 0.35 W/m° C. at 27° C. In FIG. 6, the multiple input optical fibers 111 and the output optical fiber 112 of the optical fiber combiner 110 pass through the optical fiber inlet 502 and the optical fiber outlet 503, respectively. To finish packaging the optical fiber combiner, a fifth epoxy is applied on the optical fiber inlet 502 and the optical fiber outlet 503, thus completely sealing the case with a case lid (not shown) on top of the case 501. The fifth epoxy, which is flexible, not only secures the multiple input optical fibers 111 and the output optical fiber 112 of the optical fiber combiner 110 in place but also serves as a strain relief to allow the multiple input optical fibers 111 and the output optical fiber 112 to move a little without cracking or breaking. The corrugated structure on the optical fiber inlet 502 and the optical fiber outlet 503 helps the fifth epoxy allow flexibility in the optical fibers without exerting stress on the vulnerable inlet and outlet holding the optical fibers. In FIG. 6, the one or more thermally conductive sheaths 210, made of copper wires, braided sleeves, or metallic foils that have high thermal conductivity better than 100 W/m° C. at 27° C., protrude the overlay structure 205 in both lengthwise directions with two protrusions 212 (shown in FIG. 5), which can be fixed in the case 501 to increase thermal dispersion. Furthermore, the case 501 comprises a heat pipe 510 disposed near bottom of the case 501. The heat pipe 510 is one of the most efficient ways to move heat or thermal energy from the case 501 to its environment as long as a temperature difference exists. The heat pipe 510, which is cylindrical in cross-section with a wick on the inner diameter, is a sealed vessel that is evacuated and backfilled with a working fluid, typically in a small amount. The heat pipe uses a combination of evaporation and condensation of this working fluid to transfer heat in an extremely efficient way. A cool working fluid moves through the wick from the colder side (condenser) to the hotter side (evaporator) where it vaporizes. This vapor then moves to the condenser's heat sink, bringing thermal energy along with it. The working fluid condenses, releasing its latent heat in the condenser. The cycle repeats to continuously remove heat from the case 501. The temperature drop in the system is minimal due to the very high heat transfer coefficients for boiling and condensation. Effective thermal conductivity can reach 1000 W/m° C. for the heat pipe 510, in comparison with roughly 400 W/m° C. for copper.

Whereas preferred embodiments of the present disclosure have been shown and described, it will be realized that alterations, modifications, and improvements may be made thereto without departing from the scope of the following claims. Another package of an optical fiber combiner assembly with a thermally conductive means using various kinds of combinations to accomplish the same or different objectives could be easily adapted for use from the present disclosure. Accordingly, the foregoing descriptions and attached drawings are by way of example only, and are not intended to be limiting.

What is claimed is:

1. A heat-sinking package of an optical fiber combiner, comprising:
   an optical fiber combiner assembly comprising an overlay structure comprising:
      a long shallow receptacle divided into a first compartment, a second compartment, and a third compartment on an upper side of the overlay structure, and
      an optical fiber combiner with multiple input optical fibers and an output optical fiber, wherein the optical fiber combiner is fixed on the upper side of the overlay structure with three epoxies respectively applied in the first compartment, the second compartment, and the third compartment; and
   a case with an optical fiber inlet and an optical fiber outlet arranged on opposite ends of the case, each of the optical fiber inlet and the optical fiber outlet comprising a corrugated structure, wherein the optical fiber combiner assembly is fixed with a fourth epoxy applied on a bottom side of the overlay structure;
   wherein the optical fiber combiner receives optical energy from multiple laser pumps inputted via the multiple input optical fibers, combines the multiple laser pumps, and couples the combined multiple laser pumps into the output optical fiber;
   wherein the multiple input optical fibers and the output optical fiber are partially stripped for a stripped portion substantially in a middle area of the optical fiber combiner and two non-stripped portions out of the stripped portion; and
   wherein the corrugated structure of each of the optical fiber inlet and the optical fiber outlet is configured to respectively accommodate the multiple input optical fibers and the output optical fiber and to allow an epoxy to apply so as to secure the multiple input optical fibers and the output optical fiber in place and serve as a strain relief to allow flexibility without exerting stress on the multiple input optical fibers and the output optical fiber.

2. The heat-sinking package of claim 1, wherein the overlay structure is made of a polymer material.

3. The heat-sinking package of claim 2, wherein the polymer material is mixed with a filler, configured to achieve a predetermined thermal conductivity and a predetermined thermal expansion coefficient.

4. The heat-sinking package of claim 1, wherein the overlay structure is made by using three-dimensional (3-D) printing technology.

5. The heat-sinking package of claim 1, wherein the overlay structure comprises a resin and a metal powder mixed in the resin to achieve a predetermined thermal conductivity and a predetermined thermal expansion coefficient.

6. The heat-sinking package of claim 1, wherein the three epoxies applied in the overlay structure comprise respective high, low, and high refractive indices relative to a refractive index of the cladding of the multiple input optical fibers and the output optical fiber.

7. The heat-sinking package of claim 1, wherein two interfaces between the stripped portion and the two non-stripped portions of the multiple optical input fibers and the output optical fiber are in the first compartment and the third compartment, respectively.

8. The heat-sinking package of claim 1, wherein the overlay structure further comprises one or more thermally conductive sheaths disposed in the long shallow receptacle, the one or more thermally conductive sheaths being configured to transport heat from the optical fiber combiner to the case.

9. The heat-sinking package of claim 8, wherein the one or more thermally conductive sheaths comprise copper wires, braided sleeves, metallic foils, or a combination thereof.

10. The heat-sinking package of claim 1, wherein the corrugated structure of each of the optical fiber inlet and the optical fiber outlet is of an internal thread type.

11. The heat-sinking package of claim 1, wherein the case further comprises corrugated structures configured to facilitate thermal dispersion.

12. The heat-sinking package of claim 1, wherein the case further comprises a heat pipe with an evaporator portion in the case and a condenser portion outside the case, configured to remove heat from the case.

13. The heat-sinking package of claim 1, wherein the case further comprises inner surfaces with a dark tone, configured to absorb optical energy escaped from the multiple input optical fibers and the output optical fiber.

14. The heat-sinking package of claim 1, wherein the overlay structure is made of an optically transparent material.

15. The heat-sinking package of claim 1, wherein the overlay structure is made of sapphire.

\* \* \* \* \*